United States Patent [19]

Holson

[11] 4,019,943

[45] Apr. 26, 1977

[54] PHOTOGRAPHIC ALBUM PAGE AND METHOD OF MAKING SAME

[75] Inventor: Sheldon Holson, Norwalk, Conn.

[73] Assignee: The Holson Company, Wilton, Conn.

[22] Filed: Jan. 6, 1976

[21] Appl. No.: 646,653

Related U.S. Application Data

[60] Continuation-in-part of Ser. No. 508,526, Sept. 23, 1974, abandoned, which is a division of Ser. No. 422,922, Dec. 10, 1973, Pat. No. 3,869,820.

[52] U.S. Cl. .............................. 156/227; 40/158 R; 156/252; 156/291

[51] Int. Cl.² .............................. B29D 23/10

[58] Field of Search .......... 156/226, 227, 204, 513, 156/514, 108, 291, 252; 40/158 R, 158 B, 159, 104.19

[56] References Cited

UNITED STATES PATENTS

| | | | |
|---|---|---|---|
| 2,014,743 | 9/1935 | Metzlen | 40/159 |
| 2,844,900 | 7/1958 | Miller | 40/158 R |
| 3,389,485 | 6/1968 | Roubal | 40/159 |

*Primary Examiner*—David A. Simmons

*Attorney, Agent, or Firm*—Charles E. Temko

[57] ABSTRACT

A photographic album page formed of a single blank of paper progressively folded to form three plies including apertured outer laminae and a centrally disposed inner lamina therebetween. Photographic prints are positioned and frictionally maintained between one of the outer laminae and one surface of the inner lamina to be removed or adjusted as desired. The inner lamina includes laterally extending projections positioned outwardly of the side edges of the outer laminae to facilitate insertion of prints into pockets formed therebetween. By forming the entire page from a single elongated web, a continuous line operation employing automated production machinery is possible.

3 Claims, 11 Drawing Figures

PHOTOGRAPHIC ALBUM PAGE AND METHOD OF MAKING SAME

This application is a continuation-in-part of my copending application, Ser. No. 508,526, filed Sept. 23, 1974, now abandoned, said application, in turn, being a division of Ser. No. 422,922, filed Dec. 10, 1973, now U.S. Pat. No. 3,869,820, granted Mar. 3, 1975.

BACKGROUND OF THE INVENTION

This invention relates generally to the field of photographic albums for the storage of prints, and more particularly to an improved page therefore which may be formed of a unitary blank of fibrous material glued in laminated condition to form pockets for the frictional retention of prints inserted thereinto. Devices of this general type are known in the art, and the invention lies in specific constructional details permitting lowered cost of manufacture and facilitated use.

It is known in the art to laminate paper stock to form pockets for print reception, and to provde means on a transverse edge thereof for incorporation into a looseleaf or other type binder. Other constructions include the provision of a paper base lamina, the opposed surfaces of which are coated with a pressure-sensitive adhesive to which a transparent lamina of acetate or vinyl material is selectively adhered, prints being retained between the base and the transparent lamina.

SUMMARY OF THE INVENTION

Briefly stated, the invention contemplates the provision of a single blank of web paper stock which is progressively apertured, embossed and glued in overlapped condition to provide a tri-laminar page having a solid centrally disposed base lamina and a pair of outer laminae having rectangular or other apertures overlying a surface of the base lamina. The outer laminae are glued to the base lamina to define a plurality of transversely extending pockets having openings along the longitudinal edges of the page for the insertion of photographic prints to be frictionally retained beneath an aperture in the respective outer lamina. The single blank forming means for interconnecting all of the lamina permits the manufacture of the the page as a continuous line operation.

BRIEF DESCRIPTION OF THE DRAWINGS

In the drawings, to which reference will be made im the specification, similar reference characters have been employed to designate corresponding parts throughout the several views.

DETAILED DESCRIPTION OF THE DISCLOSED EMBODIMENT

Figure 1:
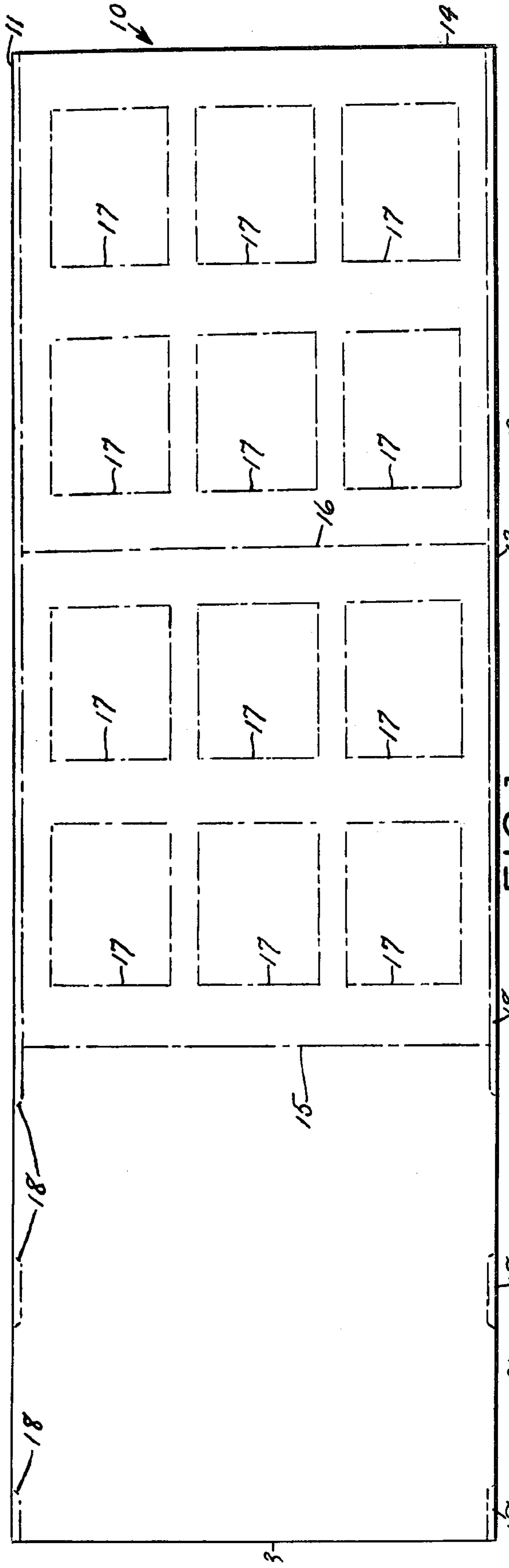
FIG. 1 is an elevational view of a rectangular blank of material from which the entire device is formed.

In accordance with the principal form of the invention, FIG. 1 illustrates a rectangular blank 10 of material from which the page is formed. The blank 10 is bounded by longitudinal side edges 11 and 12, and end edges 13 and 14. Fold lines 15 and 16, rectangular apertures 17, and longitudinal edge segments 18 are indicated in dashed lines in FIG. 1, the lines 15 and 16 being subsequently scored, if necessary, and the apertures 17 and edge segments 18 being subsequently severed as a first step, wherein the blank assumes the appearance shown in FIG. 2.

Figure 2:
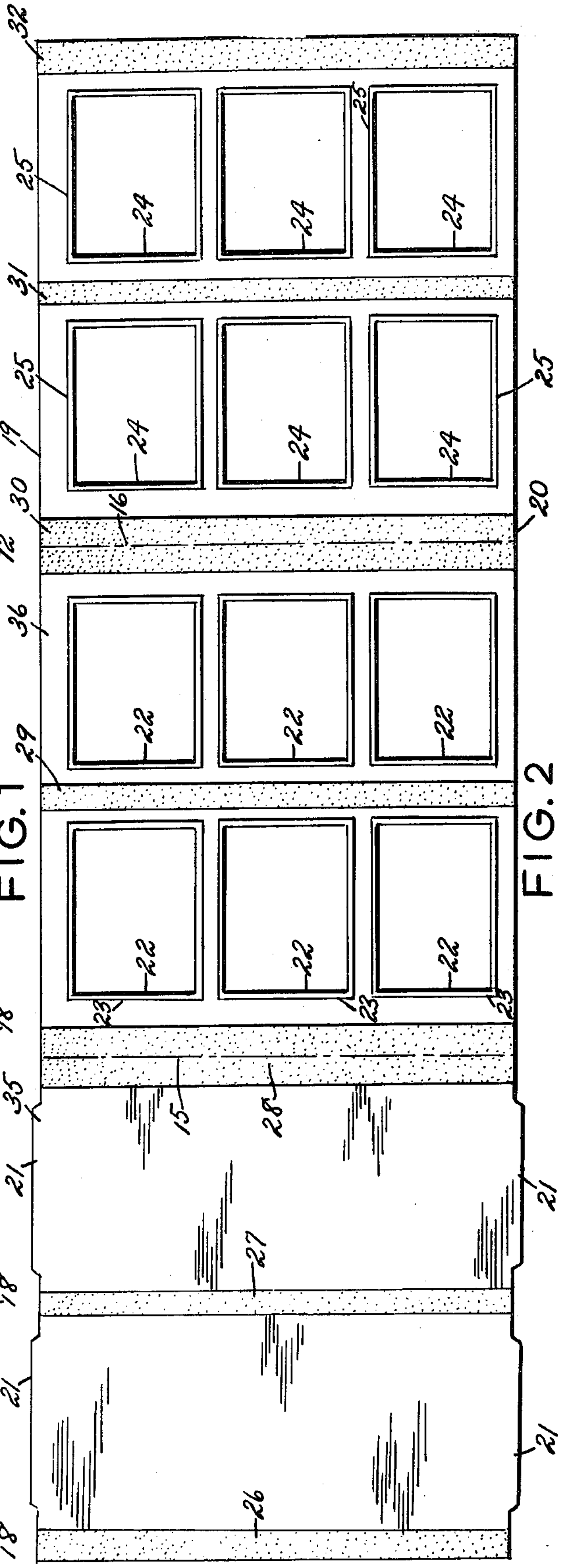
FIG. 2 is an elevational view of the blank after cutting, embossing and the application of glue to the blank.

As illustrated in FIG. 2, the blank is now bounded by cut side edges 19 and 20 which form a plurality of projecting tabs 21. Cut rectangular apertures 22 may be provided, if desired, with an embossed border 23 in the centrally disposed third of the blank. A second set of apertures 24 having embossed borders 25 is positioned in the righthand third of the blank, so that when the blank is folded about the fold lines 15 and 16, the apertures 22 will be placed in congruent relation with respect to the apertures 24 on either side of the lefthand third of the blank.

An adhesive is then applied to a plurality of transversely extending areas 26, 27, 28, 29, 30, 31 and 32, this adhesive preferably being in the form of a strong glue or cement in the interests of mechanical strength, rather than a pressure-sensitive adhesive.

Figure 3:
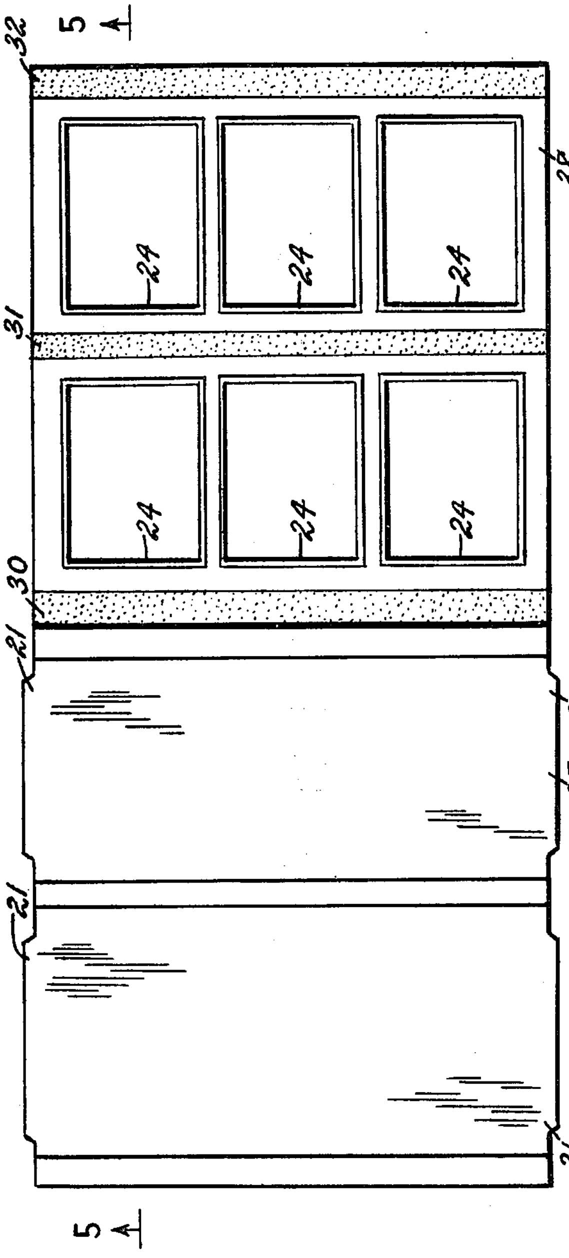
FIG. 3 is an elevational view showing the blank in partially folded and glued condition, illustrating a step subsequent to that seen in FIG. 2.
Figure 4:
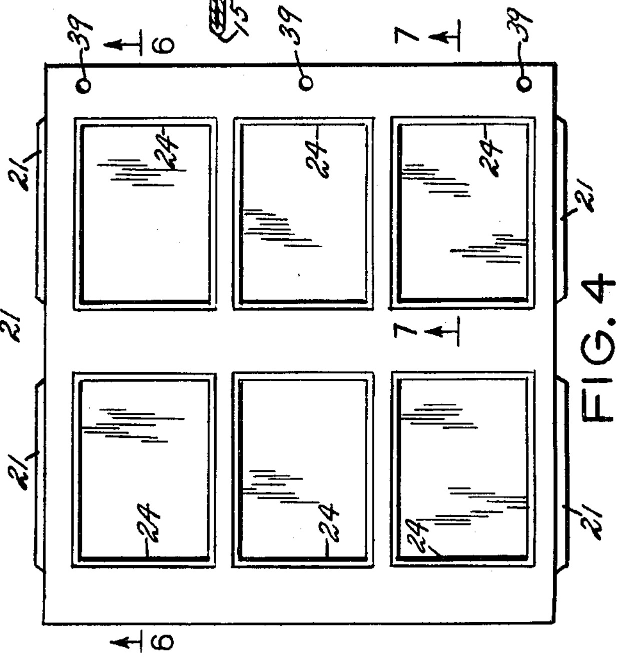
FIG. 4 is a similar elevational view, showing the blank completely folded and glued, and illustrating a step subsequent to that seen in FIG. 3.
Figure 5:
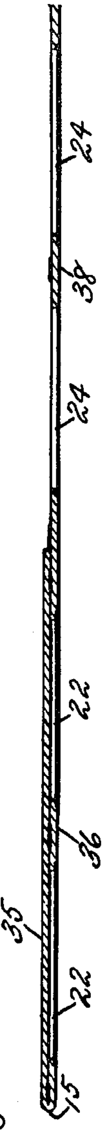
FIG. 5 is a longitudinal sectional view as seen from the plane 5—5 in FIG. 3.
Figure 6:
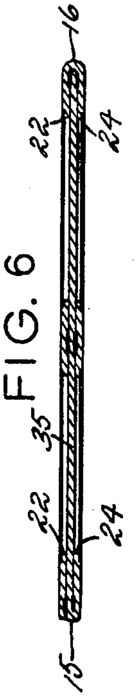
FIG. 6 is a longitudinal sectional view as seen from the plane 6—6 in FIG. 4.
Figure 7:
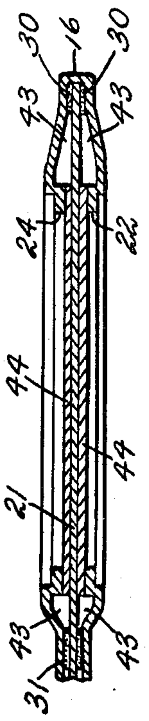
FIG. 7 is an enlarged fragmentary sectional view as seen from the plant 7—7 in FIG. 4.
Figures 8, 9, 10, 11:
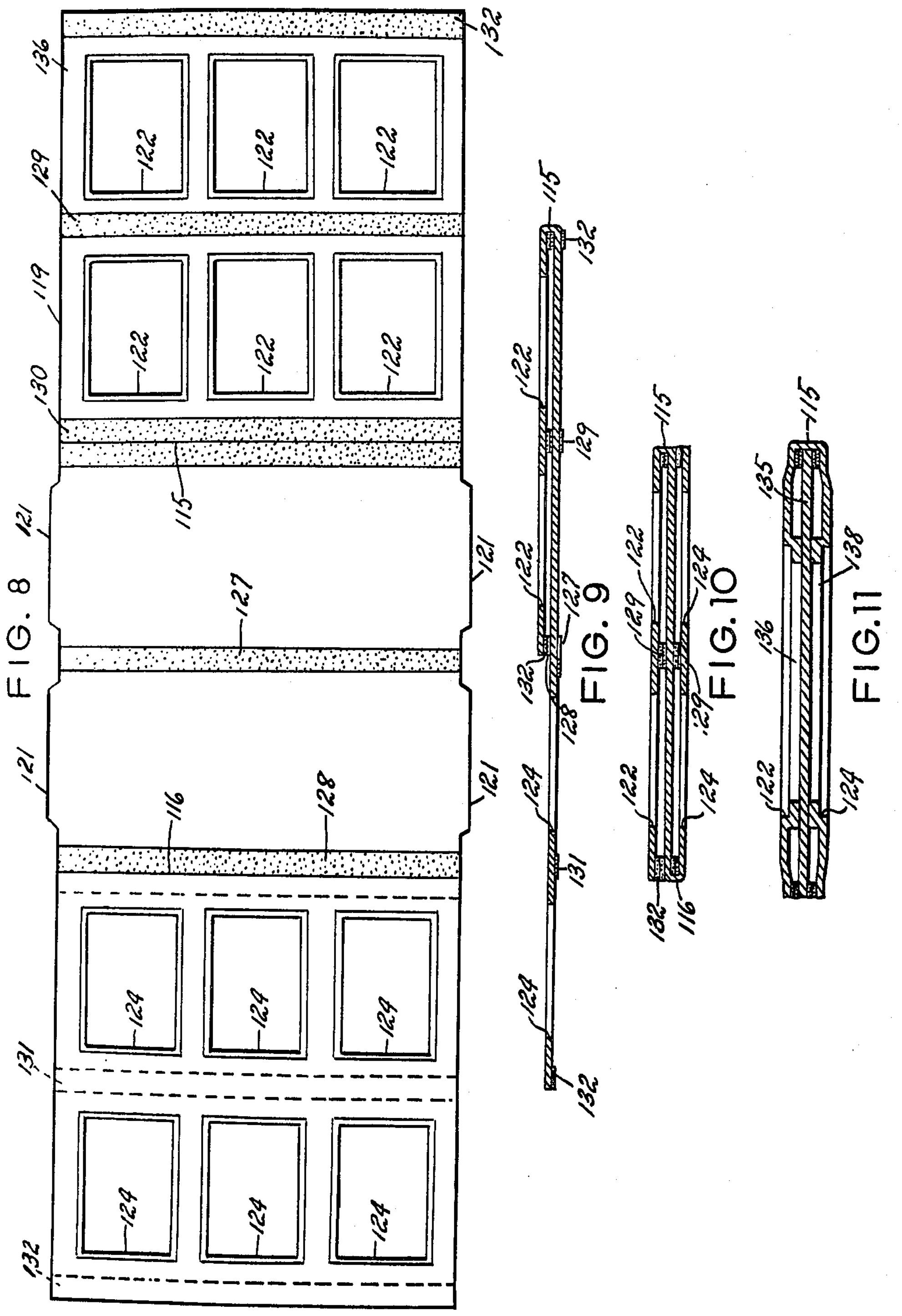
FIG. 8 is an elevational view of a blank after cutting, embossing and the application of glue to the blank, corresponding to that seen in FIG. 2, but showing a variant form of blank.
FIG. 9 is a longitudinal sectional view corresponding to that seen in FIG. 5, but showing the variant form.
FIG. 10 is a longitudinal sectional view corresponding to that seen in FIG. 6, and showing the variant form.
FIG. 11 is an enlarged fragmentary sectional view corresponding to that seen in FIG. 7, showing the variant form.

Referring to FIGS. 3 and 5, the leftwardmost third (FIG. 2) ofthe blank is folded through 180°to lie upon a inner surface of the middle third of the blank, thus forming a central lamina 35 and a first outer lamina 36. This operation is followed, as seen in FIGS. 4 and 6 by the folding of the righthand third of the blank to overlie the opposite surface of the lamina 35 and form a second outer lamina 38. Following this, holes 39 may be punched for the accommodation of a loose leaf binder, or other well known means (not shown) may be employed in the case of a permanent binding. As seen in FIG. 6, the apertures 22 and 24 are now in congruent relation on either side of the central lamina 35, and since the outer lamina 36 and 38 are glued only along transversely extending lines 26–32, inclusive, there are formed a plurality of pockets 43 of a width corresponding to that of the prints 44 disposed therein (FIG. 7).

Prints are inserted from the longitudinal edges of the page, the tabs 21 assisting in opening of the pockets, and are moved inwardly until they are opposite the desired aperture, at which point they are frictionally retained. In the case of prints which are centrally located in the pockets, they are moved past the peripherally located aperture by contacting the surface thereof through said apertures until they are located at the desired position.

FIGS. 8 through 11, inclusive, illustrate a variant form of the embodiment, and method, in which, to avoid needless repetition, parts corresponding to those of the principal form have been designated by similar reference characters with the additional prefix "1."

The variant form differs from the principal form in that the imperforate central lamina 135 is longitudinally centrally disposed in the blank 110 between the lamina 136 and 138. Each of the latter are folded above an edge 115 and 116, respectively, interconnecting the same to the lamina 135 in opposite directions.

This variation requires the application of glued areas 130, 131 and 132 on opposite surfaces of the blank 110, rather than on a single surface as is the case in the principal form.

It may thus be seen that I have invented novel and highly useful improvements in a photographic album page, which, by virtue of being formed from a single piece of material, may be manufactured as an inline operation, requiring only cutting, embossing, gluing and folding steps to form a completed page. Since the device is made entirely of paper, the cost of materials is low, and mechanical strength is high. Where desired, the central lamina may be printed with solid colors on either or both surfaces to more clearly outline the apertures, and present an attractive appearance where the pockets are not completely filled.

I wish it to be understood that I do not consider the invention limited to the precise details of structure shown and set forth in this specification, for obvious modifications will occur to those skilled in the art to which the invention pertains.

I claim:

1. The method of making a photographic album page comprising the steps of:

providing an elongate planar blank of fibrous material having a pair of longitudinal side edges and first and second free end edges;

delineating three adjacent, substantially equally sized, rectangular areas along the principal axis of said blank to form interconnected first, second and third laminae;

cutting from only two of said first, second and third laminae a corresponding plurality of rows of substantially rectangular apertures to form a pair of apertured laminae, and a single imperforate laminae;

applying an adhesive in a plurality of transversely extending rows to at least one surface of said blank in areas bordering said rows of apertures in said pair of apertured laminae;

folding one of said apertures laminae upon said imperforate lamina to adhere a surface of the former upon the latter, and defined a plurality of pockets accessible from the longitudinal edges of the now laminated laminae; and folding the other of said apertured laminae; about said imperforate lamina to adhere a second surface of said imperforate lamina and define a second plurality of similar pockets disposed in substantially congruent relation relative to said first set of pockets.

2. The method in accordance with claim 1, further characterized in that the cutting of apertures is performed upon the two adjacent laminae, and the adhesive is applied to only a single surface of said blank.

3. Th method in accordance with claim 1, further characterized in that cutting of apertures is performed upon two non-adjacent laminae which are separated by said imperforate lamina, and the adhesive is applied to both surfaces of said blank.

* * * * *